March 29, 1927.
L. HOFMEISTER
METHOD OF PRODUCING FUR PELTS
Filed March 1, 1926
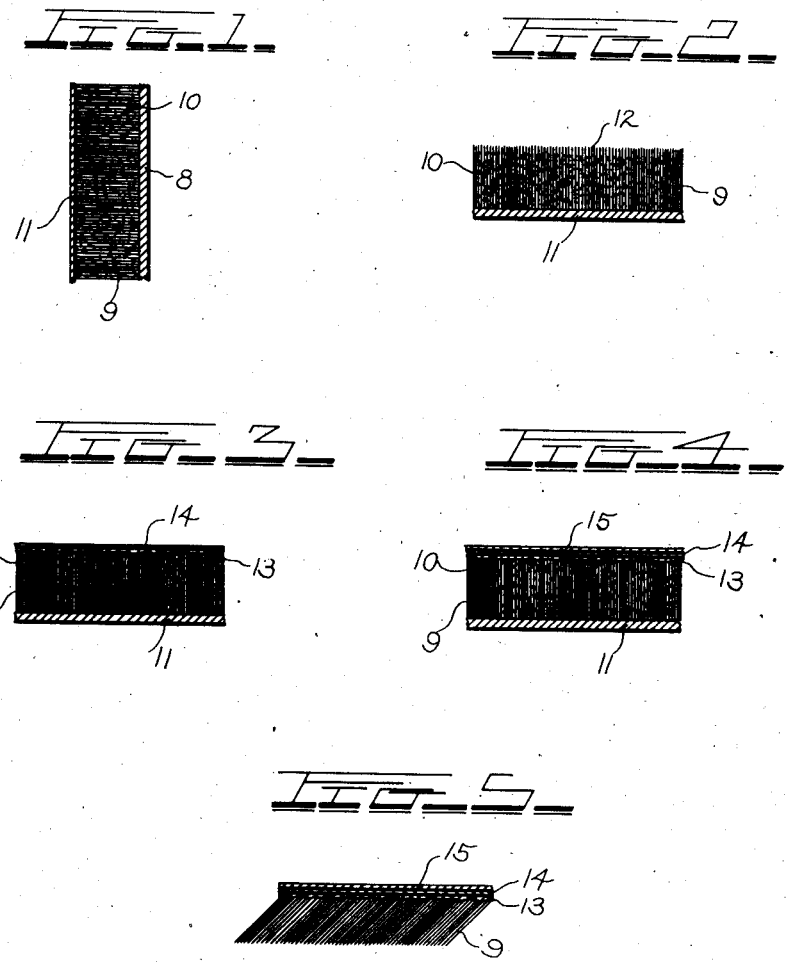
INVENTOR.
BY Leo Hofmeister
Morsell, Keeney & Morsell,
ATTORNEYS.

Patented Mar. 29, 1927.

1,622,720

UNITED STATES PATENT OFFICE.

LEO HOFMEISTER, OF MILWAUKEE, WISCONSIN.

METHOD OF PRODUCING FUR PELTS.

Application filed March 1, 1926. Serial No. 91,549.

This invention relates to improvements in the method of producing fur pelts.

Heretofore, in order to utilize the fur from animals it has been necessary to kill and skin the animal. Large amounts of money are annually spent in raising animals for this purpose and due to the necessity of killing the animals, many of which are very expensive and valuable, it is only possible to secure one fur crop or pelt from an animal and a valuable fur producer is thus sacrificed.

The present invention contemplates a method of utilizing the natural fur from animals without the necessity of killing or skinning the animal, making it possible to realize a fur crop from each animal at least annually.

A further object of the invention is to provide a method of producing semi-artificial fur pelts having natural animal fur, and not differing in appearance or quality in any degree from pelts as now produced.

A further object of the invention is to provide a method of producing fur pelts in which the pelts so produced are stronger and more readily adapt themselves for use in garments than the ordinary fur pelts now in use.

A further object of the invention is to provide a new method of producing fur pelts which may be carried out in a very simple, effective, and inexpensive manner.

With the above and other objects in view the invention consists of the improved method of producing fur pelts, and its parts and combinations as set forth in the claims, and all equivalents thereof.

In the accompanying drawing in which the same reference characters indicate the same parts in all of the views:

Fig. 1 is a sectional view showing the first step in the method of producing the pelt;

Fig. 2 is a sectional view illustrating the second step in the process;

Fig. 3 is a sectional view showing the next step;

Fig. 4 is a sectional view showing the succeeding step; and

Fig. 5 is a sectional view illustrating the finished pelt.

In carrying out the improved process, a live animal whose fur is desired is selected and the fur to be utilized is filled with a cohesive, easily removable filler such as fat, gluten, albumin, soap, oil, paste, blood, gum, or a similar substance, the object of this filler being to bind the hair into a unit. The fur with its filler may be still further united by incorporating into the filler or pasting over the free ends of the hair a reinforcing material as netting, strips of fabric, or any other suitable binder. As shown in Fig. 1 the numeral 8 indicates the skin of the animal with the fur or hair 9 extending therefrom, the same being bound by the cohesive filler 10 and having a reinforcing material 11 secured to the free ends of the fur.

When the fur is thus prepared, it is next clipped or shaved from the animal very close to the animal's skin and then the clipped portion is put upon a table, as illustrated in Fig. 2, with the free ends of the hair up and resting on the reinforcing strip 11. Then enough of the filler is removed so that the hair is clean about one thirty-second of an inch down from the free ends, as indicated by the numeral 12. This cleaned area is then covered with an adhesive, indicated by the numeral 13 in Fig. 3, and such as liquid rubber, and allowed to dry. Over the liquid rubber a thin sheet of rubber 14 is placed, and this is then reinforced by a suitable fabric (see 15, Fig. 4) which is vulcanized to the sheet of rubber, thereby forming a skin which is quite strong and pliable in which the fur is embedded at the flesh end. Many other skin substitutes may be used with advantage as artificial or natural leather, or fabrics of any kind, paper, celluloid, or other substances to which the fur is attached by glue or other means.

The last step in the process is the removal of the filler and reinforcing material with the result shown in Fig. 5. The finished pelt preserves the natural fur in its original splendor on an artificial background which may be made in as many layers as desired and which is stronger than the natural fur, better wearing, and of any weight, texture, color, or appearance. Also the fur may be brushed as desired.

From the foregoing it will be seen that the animal which produces the fur is in no way injured and will live to give other coats of fur which can be harvested in the foregoing manner at maturity. Also the improved method of producing fur pelts is very simple and is well adapted for the purposes described.

What I claim as my invention is:

1. The method of producing fur pelts which consists of binding together under normal temperatures a mass of fur on a living animal, then removing the mass from the animal close to its skin, and then securing the fur to a suitable backing.

2. The method of producing fur pelts which consists of filling a desired portion of fur on a living animal with a cohesive material at normal temperatures, removing said portion from the animal close to its skin, and then securing the flesh side of the fur to a suitable backing.

3. The method of producing fur pelts which consists of filling a desired portion of fur on a living animal with a cohesive material, securing a reinforcing material to the outer ends of the filled fur, removing said fur from the animal close to its skin, securing the flesh side of the fur to a suitable backing, and then removing the cohesive and reinforcing materials.

4. The method of producing fur pelts which consists of filling a desired portion of fur on a living animal with a cohesive material, securing a reinforcing material to the outer ends of the filled fur, cutting the fur thus prepared from the animal close to its skin, removing the cohesive material from the flesh ends of the fur, securing a suitable backing to said portion of the fur, and then removing the remaining cohesive material and the reinforcing material.

In testimony whereof, I affix my signature.

LEO HOFMEISTER.